US009767192B1

United States Patent
Russak et al.

(10) Patent No.: US 9,767,192 B1
(45) Date of Patent: Sep. 19, 2017

(54) AUTOMATIC CATEGORIZATION OF SAMPLES

(71) Applicant: AZURE VAULT LTD., Ramat Gan (IL)

(72) Inventors: Ze'ev Russak, Ramat Gan (IL); Anatoli Rotman, Ramat Gan (IL)

(73) Assignee: AZURE VAULT LTD., Ramat Gan (IL)

( * ) Notice: Subject to any disclaimer, the term of this patent is extended or adjusted under 35 U.S.C. 154(b) by 16 days.

(21) Appl. No.: 13/795,238

(22) Filed: Mar. 12, 2013

(51) Int. Cl.
*G06F 17/30* (2006.01)

(52) U.S. Cl.
CPC .............................. *G06F 17/30707* (2013.01)

(58) Field of Classification Search
CPC .................................................. G06F 17/30303
See application file for complete search history.

(56) References Cited

U.S. PATENT DOCUMENTS

| 7,050,932 | B2 | 5/2006 | Selby et al. |
| 7,523,384 | B2 | 4/2009 | Wold |
| 2004/0107205 | A1* | 6/2004 | Burdick et al. ............... 707/102 |
| 2006/0155743 | A1* | 7/2006 | Bohannon et al. ........... 707/102 |
| 2006/0167873 | A1* | 7/2006 | Degenaro et al. ................ 707/6 |
| 2007/0105105 | A1* | 5/2007 | Clelland .............. C12Q 1/6809 |
| | | | 435/6.14 |
| 2007/0198653 | A1* | 8/2007 | Jarnagin .................. G06F 19/28 |
| | | | 709/217 |
| 2008/0167837 | A1 | 7/2008 | Basak et al. |
| 2009/0142792 | A1* | 6/2009 | Robinson ............. G01N 33/564 |
| | | | 435/29 |

(Continued)

OTHER PUBLICATIONS

Lee et al., "ReasonSense?: simple linear fluorescent probes for quantitative homogenous rapid polymerase chain reaction." Analytica Chimica Acta 2002, available on line Nov. 28, 2001, vol. 457, pp. 61-70.

(Continued)

*Primary Examiner* — Mohammad S Rostami
(74) *Attorney, Agent, or Firm* — Acuity Law Group, PC; Michael A. Whittaker

(57) ABSTRACT

A computer implemented method for automatic categorization of samples, the method comprising steps a computer is programmed to perform, the steps comprising: on a computer, receiving a plurality of data units, each one of the data units labeling a respective sample of a physical substance, parsing each one of the data units into at least one respective ordered list of one or more specific tokens, for at least one subgroup of the ordered lists, the subgroup consisting of ordered lists of a same number of specific tokens, merging at least two ordered lists in which each pair of specific tokens of a same order of in-ordered-list positioning are at least one of a group consisting of: a pair of identical specific tokens, and a pair of non-identical specific tokens matching a same general token, into an ordered list defining a pattern common to the ordered lists being merged, and categorizing a sample by matching a data unit labeling the sample being categorized, to at least one of a plurality of labeling patterns, each one of the labeling patterns being defined by a respective one of the ordered lists resultant upon the merging.

26 Claims, 14 Drawing Sheets

(56) References Cited

U.S. PATENT DOCUMENTS

| | | | |
|---|---|---|---|
| 2011/0004626 A1* | 1/2011 | Naeymi-Rad | G06N 7/005 707/776 |
| 2011/0047171 A1* | 2/2011 | Paparizos et al. | 707/760 |
| 2011/0082847 A1* | 4/2011 | Dodds | 707/705 |
| 2011/0124022 A1* | 5/2011 | Nagalla | G01N 33/6893 435/15 |
| 2011/0129472 A1* | 6/2011 | Duckers | C12Q 1/6883 424/135.1 |
| 2011/0167063 A1* | 7/2011 | Tengli et al. | 707/737 |
| 2013/0246460 A1* | 9/2013 | Maltbie | G06F 19/28 707/771 |
| 2014/0199716 A1* | 7/2014 | Bertozzi | G01N 33/6848 435/23 |

OTHER PUBLICATIONS

Brechtbuehl et al., "A rapid real-time quantitative polymerase chain reaction for hepatitis B virus", Journal of Virological Methods, 2001, available on line Apr. 10, 2001, vol. 93, pp. 105-113.

* cited by examiner

510

| Sample Name | Sample Category | Property | Sensor Readings |
|---|---|---|---|
| Pos | Positive control | -- | 0, 1, 5, 100, 1E5 |
| POS | Positive control | -- | 0, 0.5, 4, 140, 1E5 |
| NEG | Negative control | | 1, 2, 1, 1, 3 |
| DILL0.5 | Dilution control | 0.5 | 0, 1, 2, 10, 100 |
| DILL0.05 | Dilution control | 0.05 | 0, 1, 1, 6, 40 |
| DILL 5E-3 | Dilution control | 0.005 | 0, 0.5, 1, 4, 20 |
| Seed_001 | Unknown sample | 1 | 0, 1, 1, 6.1, 44 |
| Seed-2 | Unknown sample | 2 | 0, 1, 1, 610, 4400 |
| Seed_3 | Unknown sample | 3 | 1, 2, 1, 1, 3 |
| ... | ... | ... | |
| Seed 10000 | Unknown sample | 10000 | 1, 2, 1, 1, 0.5 |

| Pattern | Category | Numerical |
|---|---|---|
| ^pos | Positive Control | -- |
| ^neg | Negative Control | -- |
| ^dil\W*(\d+) | Dilution Control | As matched by (\d+) |
| ^seed\W*(\d+) | Unknown sample | As matched by (\d+) |

| Sample Name | Ordered List |
|---|---|
| Pos | "pos" |
| POS | "pos" |
| NEG | "neg" |
| DILL0.5 | "dill", "0.5" |
| DILL0.05 | "dill", "0.05" |
| DILL 5E-3 | "dill", "5e-3" |
| DILL 5E-3 | "dill", "5", "e" "-3" |
| Seed_001 | "seed","1" |
| Seed-2 | "seed","2" |
| Seed_3 | seed","3"" |
| Seed 10000 | "seed","10000" |

Fig. 5C

| General Token | Match | Regular Expression |
|---|---|---|
| {float} | 100.1 | [-+]?[0-9]*\.?[0-9]*. |
| {text} | Sample | \w+ |
| {integer} | 100 | \d+ |
| {scientific} | 1.5E-6 | [-+]?[0-9]*\.?[0-9]+([eE][-+]?[0-9]+)? |
| {anything} | Line1 | .* |
| pos | positive | pos |

| Sample Name | Specific | General 1 | General 2 |
|---|---|---|---|
| Pos | 'pos' | 'pos' | |
| POS | 'pos' | 'pos' | |
| NEG | 'neg' | 'neg' | |
| DILL0.5 | 'dill', '0.5' | 'dill', '{float}' | 'dill', '{integer}','{integer}' |
| DILL0.05 | 'dill', '0.05' | 'dill', '{float}' | 'dill', '{integer}','{integer}' |
| DILL 5E-3 | 'dill', '5e-3' | 'dill', '{scientific}' | 'dill', '{integer}','e', '{integer}' |
| Seed_001 | 'seed','1' | 'seed', '{integer}' | |
| Seed 2 | 'seed','2' | 'seed', '{integer}' | |
| Seed_3 | 'seed','3' | 'seed', '{integer}' | |
| ... | | | |
| Seed 10000 | 'seed','10000' | 'seed', '{integer}' | |

|  | Ordered List | General Tokens |
|---|---|---|
| Labeling Pattern 1 | 'dill','{integer}', '{scientific}' | 'dill','{integer}', '{scientific}' |
| Labeling Pattern 2 | 'pos' | 'pos' |
| Labeling Pattern 3 | 'neg' | 'neg' |
| Labeling Pattern 4 | 'Seed', '{integer}' | 'Seed', '{integer}' |
| Labeling Pattern 5 | 'neg' | 'neg' |
| Labeling Pattern 6 | 'dill','{integer}', '{scientific}' | 'dill','{integer}', '{scientific}' |
| Labeling Pattern 7 | 'dill','{integer}', '{scientific}' | 'dill','{integer}', '{scientific}' |
| Labeling Pattern 8 | 'Quantity','1', 'float' | 'Quantity','{integer}', 'float' |

Fig. 5G

|  | Ordered List |
|---|---|
| Unique Pattern 1 | "dill","{integer}", "{scientific}" |
| Unique Pattern 2 | "pos" |
| Unique Pattern 3 | "neg" |
| Unique Pattern 4 | "Seed", "{integer}" |
| Unique Pattern 5 | "Quantity","1", "float" |

AUTOMATIC CATEGORIZATION OF SAMPLES

FIELD AND BACKGROUND OF THE INVENTION

The present invention relates to samples of a physical substances such as blood samples, tissue samples or a food samples, taken in laboratories, hospitals, factories, etc., and more particularly, but not exclusively to automatic categorization of such samples.

Every day, millions of samples (say blood or urine samples) are taken from subjects such as human beings or farm animals, from food products, etc.

For example, according to figures released by the World Health Organization (WHO), about 95 million blood samples were taken for Human Immunodeficiency Virus (HIV) testing, in the year of 2010 alone.

Traditionally, in laboratory or field testing, each one of several samples (say a blood sample, a food sample, etc.) taken from subjects or products, is labeled with data that is assigned specifically for that sample, by a user such as a laboratory technician, a nurse, etc., or even by the subject himself.

Usually later, but occasionally before that labeling, the samples are subjected to testing, say through Real time PCR (Polymerase Chain Reaction), through a chemical reaction which is a part of a blood count, or through another chemical reaction.

The labeling data usually appears as textual description printed or hand-written on a usually, paper made label (say a sticker) physically attached to a container (say a vial or a test tube) holding a sample taken from a specific subject or product.

The textual description may have a variety of formats. The formats may include, but are not limited to: a string that marks the sample as a control sample, a string that identifies a subject (say a patient number), a string that indicates a quantity (say a dilution factor), a string that indicates a testing type required for the sample, a string that marks the sample as positive or negative, etc., as known in the art.

In an age of automation of laboratory and testing equipment, for each sample to be processed by a laboratory or a testing system (say a computerized PCR system), there must be input data labeling the sample.

Indeed, Good Laboratory Practices (GLP) standards introduced by government agencies such as the US Food and Drug Administration (FDA), dictate that medical and laboratory samples are to be identified and their medical containers be labeled, as soon as a sample enters a medical laboratory. Early labeling in the laboratory is necessary, in order to categorize, identify and track the sample, and to reduce any potential errors caused by improper identification or categorization of the sample.

Usually, the labeling data is scanned from a paper sticker applied to the sample's container (say a test tube or a vial), or input manually by a user (say a laboratory technician) who reads and manually enters the data printed on the paper sticker to a computer.

Occasionally, data labeling the sample is input by a user (say a patient or a nurse at a medical facility at which the sample is tested) directly to a computer, even without having the data printed or handwritten on a media (say a sticker) applied to the sample's container.

For example, a laboratory technician may pour a sample (say a blood sample) into a reaction chamber, and input data that labels the sample (even if not printed on the sample's container itself) to a computer that controls a chemical reaction chamber, just before instructing the computer to initiate a chemical reaction such as PCR, in the reaction chamber.

Together with physical parameters values (say fluorescence values) measured during the chemical reaction, the data labeling the sample may serve for analysis of the sample. The analysis yields a result for the sample, say the presence or absence of a certain genetic mutation in the sample.

SUMMARY OF THE INVENTION

According to one aspect of the present invention there is provided a computer implemented method for automatic categorization of samples, the method comprising steps a computer is programmed to perform, the steps comprising: a) on a computer, receiving a plurality of data units, each one of the data units labeling a respective sample of a physical substance, b) parsing each one of the data units into at least one respective ordered list of one or more specific tokens, c) for at least one subgroup of the ordered lists, the subgroup consisting of ordered lists of a same number of specific tokens, merging at least two ordered lists in which each pair of specific tokens of a same order of in-ordered-list positioning are at least one of a group consisting of: a pair of identical specific tokens, and a pair of non-identical specific tokens matching a same general token, into an ordered list defining a pattern common to the ordered lists being merged, and d) categorizing a sample by matching a data unit labeling the sample being categorized, to at least one of a plurality of labeling patterns, each one of the labeling patterns being defined by a respective one of the ordered lists resultant upon the merging.

According to a second aspect of the present invention there is provided an apparatus for automatic categorization of samples, the apparatus comprising: a computer, a data unit receiver, implemented on the computer, configured to receive a plurality of data units, each one of the data units labeling a respective sample of a physical substance, a parser, in communication with the data unit receiver, configured to parse each one of the data units into at least one respective ordered list of one or more specific tokens, a merger, in communication with the parser, configured to merge for at least one subgroup of the ordered lists, the subgroup consisting of ordered lists of a same number of specific tokens, at least two of the ordered lists in which each pair of specific tokens of a same order of in-ordered-list positioning are at least one of a group consisting of: a pair of identical specific tokens, and a pair of non-identical specific tokens matching a same general token, into an ordered list defining a pattern common to the ordered lists being merged, and a categorizer, in communication with the merger, configured to categorize a sample by matching a data unit labeling the sample being categorized, to at least one of a plurality of labeling patterns, each one of the labeling patterns being defined by a respective one of the ordered lists resultant upon merging by the merger.

According to a third aspect of the present invention there is provided a non-transitory computer readable medium storing computer executable instructions for performing steps of automatic categorization of samples, the steps comprising: a) on a computer, receiving a plurality of data units, each one of the data units labeling a respective sample of a physical substance; b) parsing each one of the data units into at least one respective ordered list of one or more specific tokens; c) for at least one subgroup of said ordered lists, the subgroup consisting of ordered lists of a same number of specific tokens, merging at least two ordered lists in which each pair of specific tokens of a same order of in-ordered-list positioning, are at least one of a group consisting of: a pair of identical specific tokens, and a pair of non-identical specific tokens matching a same general token, into an ordered list defining a pattern common to the ordered lists being merged; and d) categorizing a sample by matching a data unit labeling the sample being categorized, to at least one of a plurality of labeling patterns, each one of the labeling patterns being defined by one of the ordered lists resultant upon said merging.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 5A is a simplified diagram schematically illustrating a first table, according to an exemplary embodiment of the present invention.

FIG. 5B is a simplified diagram schematically illustrating a second table, according to an exemplary embodiment of the present invention.

FIG. 5C is a simplified diagram schematically illustrating a third table, according to an exemplary embodiment of the present invention.

FIG. 5F is a simplified diagram schematically illustrating a sixth table, according to an exemplary embodiment of the present invention.

FIG. 5G is a simplified diagram schematically illustrating a seventh table, according to an exemplary embodiment of the present invention.

DESCRIPTION OF THE EXEMPLARY EMBODIMENTS

Figure 1:
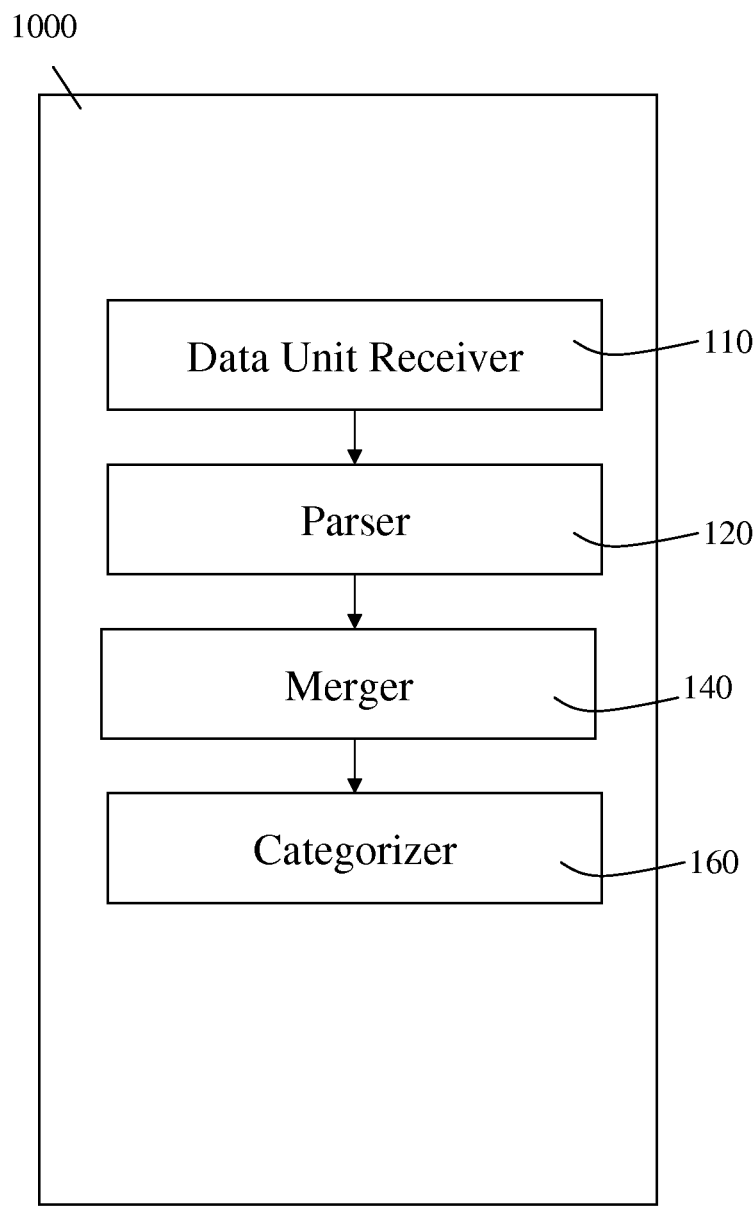
FIG. 1 is a block diagram schematically illustrating a first apparatus for automatic categorization of samples, according to an exemplary embodiment of the present invention.

The present embodiments comprise a system and a method for automatic categorization of samples.

Every day, millions of samples of physical substances such as blood or urine are labeled with data (say a short textual description) that is assigned specifically to each sample by a worker such as a laboratory technician or a nurse, or even by the subject from whom the sample is taken, as described in further detail hereinabove.

In an age of extensive automation of testing and laboratory equipment, for each of the samples, a data unit (say a short textual description) labeling the sample is usually input to a computer. The data unit may be input say by the worker who labels the sample in the first place, by a second worker (say a worker who scans labeling data originally handwritten on the sample's container by the first worker), etc.

Typically, the labeled samples are forwarded for further processing, say for subjecting of the samples to a chemical reaction such as a Polymerase Chain Reaction (PCR) or to a chemical reaction that is a part of a blood count, for processing of measurement data obtained during such a chemical reaction, etc., as known in the art.

Not all workers who label those samples, are expected to follow naming conventions in that labeling, and even for workers expected to follow such conventions, the conventions tend to vary among different laboratories. Further, most workers do not always abide fully to the conventions.

Consequently the data units input for the samples, particularly when more than one worker is involved in the labeling of the samples, are characterized by a significant lack of uniformity. Uniformity in sample labeling is often reduced even further as far as samples used for research purposes are concerned, in comparison with samples that are subjected to medical laboratory tests.

For example, one worker may use a string such as "HCVPOS" to denote positive control samples for HCV (Hepatitis C Virus) testing, while other workers would use "HCV_POS", "HCV_PTC", "HCV+," etc., to denote such positive HCV control samples. Similarly, a string such as "Patient_005" may be used to label a blood sample taken from an anonymous patient in a first laboratory, while in a second laboratory such a sample would be rather labeled with a string such as "Patient-5".

Denotation of quantitative indications such as dilution series in a chemical or biological experiment also may vary among workers or laboratories, as known in the art. For example, one worker may use the string "HCV_1E5" to denote a 1/10,000 dilution of an HCV sample (with "1E5" being a scientific notation for 10,000), whereas another worker would denote a sample with the same dilution factor as either "HCV10000" or "HCV10^5".

As there are usually no strict universal conventions defining how samples are to be labelled, there may be a practically unlimited number of possible variations for labelling of samples by laboratories, laboratory technicians, scientists, etc.

For a large enough number of samples, the lack of uniformity in sample labeling translates into difficulties in automatically categorizing samples and accurately interpreting the data input for labelling each of the samples into a computer. For example, in automatic identifying of samples as control samples or in automatic identifying of the type of testing sought for the each sample, say HIV testing or rather HCV testing.

With exemplary method according to one exemplary embodiment of the present invention, some of the problems arising from the above described lack of uniformity in labelling data, among samples labelled by different workers or laboratories, are likely to be alleviated.

In the method of the exemplary embodiment, data units received on a computer, for labeling each sample, say by a laboratory technician, are subjected to parsing.

Optionally, each one the data units, is parsed into a respective ordered list of one or more specific tokens, usually on a word boundary or numerical boundary basis.

Optionally, the data unit is parsed by matching with general tokens, such that each one of different strings of the data unit is identified through matching with a one of the general tokens, as described in further detail hereinbelow.

General tokens are general string patterns that may be defined by a user, say using regular expressions, as described in further detail hereinbelow.

Then, all samples of a same number of specific tokens are grouped into a common subgroup. That is to say that the samples are grouped into one or more subgroups, and that each subgroup consists of ordered lists with a same number of specific tokens.

Then, for each one of the subgroups, there is carried out a merging process.

The merging process involves merging ordered lists in which each pair of specific tokens of a same order of placement in the ordered list (say the pair of specific tokens each of which is positioned second in the respective ordered list) complies with a criterion. The criterion is that the two specific tokens of the pair are either identical or are matched by a common general token.

The ordered lists are merged into an ordered list defining a pattern common to the ordered lists being merged, as described in further detail hereinbelow.

Optionally, there may be removed duplicity among the ordered lists, thereby generating a group of unique ordered lists. Each unique ordered list defines a different unique pattern of labeling, as described in further detail hereinbelow.

Consequently, each sample may be categorized by matching the data unit labeling the sample to at least one of the labeling patterns.

The method may thus help to find a relatively short list of unique patterns for labeling the samples.

Optionally, each pattern is expressed as a regular expression. Stated differently, a set of regular expressions may used to cluster all the data units into a minimal yet usable set of labelling patterns, as described in further detail hereinbelow.

Using the labeling patterns, samples may be categorized and their labeling data be interpreted, based on the labeling pattern that each one of the data units that label the samples is found to match, as described in further detail hereinbelow.

The principles and operation of an apparatus, a method, and a computer readable medium, according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram schematically illustrating a first apparatus for automatic categorization of samples, according to an exemplary embodiment of the present invention.

A first apparatus 1000, according to an exemplary embodiment of the present invention, may include one or more computers, such as a desktop computer, say a desktop computer of a laboratory or a Quality Assurance (QA) department of a food manufacturer, several computers linked in a network in a medical institution, etc. The computer includes a memory, a processor, etc., as known in the art.

The computer may also be, but is not limited to: a laptop computer, a tablet computer (say an Apple® iPad), a mini tablet computer (say a Samsung® Galaxy Note), a smart phone (say an Apple® iPhone), etc., as known in the art.

The computer may also be a part of a computer device adapted specifically for missions such as testing, say a part of a portable computer device adapted for field testing or for registration of samples collected from subjects in different locations.

In one example, the portable device is adapted for sample collection, through a special design—say a design with several test tube compartments, in which each compartment is assigned a different number (say 1 to 10). Upon insertion of a test tube into one of the compartments, a user of the portable device is prompted to provide a data unit (say a short description) that labels a sample held in the test tube inserted to that compartment.

The apparatus 1000 further includes additional parts 110-160. Parts 110-160 are implemented on the computer, say by programming the computer or by installing hardware components such as printed circuits thereon.

One of the parts that the apparatus 1000 includes is a data unit receiver 110.

The data unit receiver 110 receives two or more data units, say from a technician or a nurse, as described in further detail hereinbelow.

Each one of the data units labels a respective sample of a physical substance such as blood, urine, food, soil, etc., as described in further detail hereinbelow.

For example, the data unit may be scanned from a paper sticker applied to the sample's container (say a test tube or a vial), or input manually by a user (say a laboratory technician) who reads and manually enters the data printed on the paper sticker to the data unit receiver 110 implemented on the computer.

Optionally, at least some of the data units are received from a remote computer, say from a computer in use by a laboratory remote from the apparatus 1000, in a text file, a Microsoft® Excel file, etc., as described in further detail hereinbelow.

Occasionally, the data unit labeling each one of the samples is input by a user (say a patient or a nurse at a medical facility at which the sample is tested) directly to the data unit receiver 110, even without having the data printed or handwritten on a media applied to the sample's container.

Optionally, the data unit receiver 110 stores the input data unit on a memory of the computer (not shown), say as a database record, as a small file, as a line in a spreadsheet document, etc. as known in the art.

The samples may be subjected to a chemical reaction, say to Real Time PCR (Polymerase Chain Reaction), to a histological examination, or to another form of testing, either before or after the labeling, as described in further detail hereinbelow.

Optionally, one or more of the data units comprises natural language description that labels the respective sample, as known in the art.

For example, each one of the data units may hold labeling data (say a short textual description) that is used specifically for each sample, by a worker such as a laboratory technician or a nurse, for labeling the specific sample, as described in further detail hereinabove.

Only a portion of the workers who label such samples, are expected to follow naming conventions in that labeling, and even then, the conventions tend to vary between different laboratories. In addition, most workers do not always abide fully to the conventions.

Consequently, the data units that label the samples, particularly when more than one worker is involved in the labeling of the samples, are characterized by a significant lack of uniformity, as described in further detail hereinabove.

For example, one worker would use a string such as "HCVPOS" to denote positive control samples for HCV (Hepatitis C Virus) testing, whereas other workers would use "HCV_POS", "HCV_PTC", "HCV+," etc., to denote such positive HCV control samples. Similarly, a string such as "Patient_005" may be used to label a blood sample taken from an anonymous patient in a first laboratory, whereas in a second laboratory, such a sample would be rather labeled with a string such as "Patient-5".

Denotation of quantitative indications such as dilution series may also vary among workers or laboratories. For example, one worker may use the string "HCV_1E5" to denote a 1/10,000 dilution of an HCV sample (with "1E5" being a scientific notation for 10,000), whereas another worker would rather denote a sample with the same dilution factor as either "HCV10000" or "HCV10^5".

The apparatus 1000 further includes a parser 120, in communication with the data unit receiver 110.

The parser 120 parses each one of the data units received by the data unit receiver 110, into one or more ordered list(s) of one or more specific tokens, as described in further detail hereinbelow.

Optionally, the parser 120 parses the data unit on string boundaries, say on word boundaries, on number boundaries, on alphanumeric string boundaries, on boundaries defined by blank or certain non-alphanumeric characters, etc., or any combination thereof, as described in further detail hereinbelow.

Optionally, the parser 120 parses the data unit, by matching to one or more general tokens.

General tokens are general string patterns that are pre-defined by a user of the apparatus 1000, by a programmer who generates code for implementing the apparatus 1000 on the computer, etc., say using regular expressions.

A regular expression is a set of pattern matching rules encoded in a string according to certain syntax rules, as known in the art. Regular expressions originate in the UNIX Computer Operating System and are also a part of the Perl Computer Programming Language, as known in the art.

Exemplary regular expressions that may be used for defining the general tokens include but are not limited to strings such as '\d+' that generally defines an integer number, '[−+]?[0-9]*\.?[0-9]*' that generally defines a floating point number, '\w+' that generally defines any string of one or more alphanumeric characters (without spaces), etc., as described in further detail hereinbelow.

The regular expressions used may also be more specific. For example, a user may define a general token, using a regular expression: 'pos', which expression matches specific tokens such as 'pos', 'positive', etc.

Optionally, the parser 120 parses the data unit by matching with general tokens, such that each one of different strings of the data unit is identified through matching with a one of the general tokens, as described in further detail hereinbelow.

Thus, each one of the specific tokens that the data unit is parsed to, is a string present in the data unit and conforming to the pattern defined (say using a regular expression) by one of the general tokens, as described in further detail hereinbelow.

Optionally, the parser 120 parses the received data units in a case insensitive manner, while converting all uppercase letters into lowercase letters (or vise versa).

For example, the parser 120 may parse a data unit holding the text string 'lambda 212' into an ordered list of two specific tokens: 'lambda', '212', by matching the string 'lambda' with a general token defined using the '\w+' regular expression, and the string '212' with a general token defined using the '\d+' regular expression.

Optionally, when one of a data unit's strings matches more than one general token, the parser 120 selects one of the matched general tokens, say using heuristic data encoded in computer programming code used to implement the parser 120 on the computer, as described in further detail hereinbelow.

The apparatus 1000 further includes a merger 140, in communication with the parser 120.

The ordered lists that the parser 120 parses the data units into, may include one or more subgroups, each of which consists of ordered lists of a same number of specific tokens (say a subgroup that consists of ordered lists of two specific tokens, a subgroup that consists of ordered lists of three specific tokes, etc).

For each one of the subgroups, the merger 140 merges two or more of the ordered lists of the subgroup, provided the ordered lists comply with a merging criterion, as described in further detail hereinbelow.

The merging criterion is applied to each pair of specific tokens of a same order of placement in the ordered list (say the pair of specific tokens each of which is positioned second in the respective one of the ordered lists being merged).

The merging criterion dictates that the pair of specific tokens of the same order of placement is either a pair of identical specific tokens, or a pair of non-identical specific tokens that match a same general token, as described in further detail hereinbelow.

The merger 140 merges the ordered lists that comply with the merging criterion, into an ordered list defining a labeling pattern common to the ordered lists being merged, as described in further detail hereinbelow.

Optionally, the ordered list resultant upon the merging is otherwise identical to one of the ordered list being merged but with each specific token that belongs to the pair of non-identical specific tokens, being replaced with the common general token that matches both specific tokens, as described in further detail hereinbelow.

Optionally, the merger 140 further merges the ordered list resultant upon the merging, in turn, with any one (or more) of the remaining ordered lists (either an ordered list resultant upon merging, or an ordered list resultant upon parsing only), provided the merging criterion is complied with, and so forth, as described in further detail hereinbelow.

Optionally, the merger 140 continues to merge the ordered lists, until no more of the sub-group's ordered lists can be merged under the merging criterion.

Optionally, the apparatus 1000 further includes a duplicity remover (not shown) in communication with the merger 140 or implemented as a part of the merger 140.

The duplicity remover removes duplicity among the ordered lists, as described in further detail hereinbelow.

With the duplicity removal, each previously duplicate ordered list appears only once, and none of the ordered lists are identical. Consequently, there is ensured that each ordered list defines a different and unique pattern of labeling.

The apparatus further includes a categorizer 160, in communication with the merger 140 or with the duplicity remover.

Each one of the ordered lists that are arrived at, after the merging and optional duplicity removal, defines a respective labeling pattern.

The categorizer 160 may categorize a sample by matching a data unit matching the sample with one or more of the labeling patterns arrived at, as described in further detail hereinbelow.

In one example, the categorizer 160 finds that a data unit matches a labeling pattern only if the ordered list defining the labeling pattern and a new ordered list resultant upon parsing the data unit, comply with a matching criterion.

The matching criterion is that each of the new ordered list's specific tokens is either identical to a specific token in a same order of placement in the ordered list that defines the labeling pattern, or conforms to a general pattern defined by the specific token in the same order of placement, say to the regular expression in that placement, as described in further detail hereinbelow.

The sample may be one of the samples labeled by the data units used in the parsing, classifying, and merging (i.e. a data unit received prior to the arrival at those labeling patterns), or rather a new sample labeled by a new data unit that is received later.

Optionally, the categorizer 160 further uses a category description, or other information, that is input to the computer, for one or more of the labeling patterns arrived at. The description of information may be input by a top user such as a manager of a QA department or a senior employee at a laboratory of a regulatory government agency such as the US Food and Drug Administration (FDA), etc.

For example, a manager of a laboratory may input to the computer information that marks one of the labeling patterns as corresponding to a category of positive standard samples, to a category that validates each sample that matches the labeling pattern for further processing, etc., as described in further detail hereinbelow.

Optionally, the categorizer 160 uses heuristic data received from a user of the apparatus 1000, heuristic data retrieved from a dictionary based system (say an on line dictionary accessible through the internet), etc., for categorizing the samples, as described in further detail hereinbelow. For example, the categorizer 160 may use a thesaurus, rules received from a user, etc., for the matching.

Optionally, the apparatus 1000 further includes a sample validator (not shown), in communication with the categorizer 160.

The sample validator validates a sample for further processing, according to a result of matching a data unit labeling the sample, to one of the labeling patterns arrived at.

Optionally, the apparatus 1000 further includes a control operation initiator (not shown), in communication the categorizer 160, the sample validator, or both.

The control operation initiator may initiate a control operation in a device in communication with the computer.

In one example, the control operation initiator triggers an automatic sending of an SMS (Short Messages Service) message from a cellular phone connected to the computer to a remote recipient, for conveying results of validation or categorization of a sample labeled by the recipient (say a remote laboratory).

The message may be, for example, that the sample could not be matched to any of the labeling patterns, that the sample is validated for further processing (say when the data unit labeling the sample matches a specific one of the labeling patterns), etc.

In another example, the control operation initiator may initiate an automatic disposal of a vial containing a sample labeled with an expired date (say a food product), and is thus no longer relevant for testing, say by a robot connected to the computer, etc., as described in further detail hereinbelow.

Optionally, the data unit receiver 110 further receives measurement data pertaining to one (or more) of the samples labeled by the data units (say physical parameter values such as fluorescence values measured in a reaction chamber during a chemical reaction such as PCR that the samples are subjected to).

Optionally, the apparatus 1000 further includes a data analyzer (not sown), in communication with the data unit receiver 110.

The data analyzer analyzes the measurement data using the data units, while interpreting each data unit according to the labeling pattern matched by the data unit.

With different interpretations, the data analyzer arrives at different results.

For example, a sample labeled by a data unit: 'Pos 23, 5' may be interpreted as a positive sample taken on May 23 when matched with one labeling pattern, and as a positive sample taken at 23.5° C. when matched with another labeling pattern.

Optionally, the data analyzer may include classifying the sample (say as a negative or positive sample), based on the measurement data received by the data unit receiver 110, the matched labeling pattern (i.e. the categorization by the categorizer 160), or both, as described in further detail hereinbelow.

In one example, the apparatus 1000 is used as a part of a cloud based service, as known in the art.

In the example, the data unit receiver 110 further receives an out-of-sample extension from a remote computer. The out-of-sample extension defines a rule for classifying a sample based on a classification model calculated on the remote computer. Then, the data analyzer uses the out-of-sample extension, to classify the samples labeled by the data units, using the measurement data, the matched labeling patterns (i.e. the categorization by the categorizer 160), or both.

Optionally, the classification model is rather calculated by the data analyzer itself, say through Linear Regression, Dimensional Reduction, Kernel PCA (Principal Component Analysis), etc., as known in the art.

Optionally, the control operation initiator initiates a control operation in a device in communication with the computer, upon arrival of the data analyzer at a predefined result of the analysis.

In one example, the control operation initiator initiates a control operation (say cooling of a chamber in which a chemical reaction that the sample is subjected to, takes place) when the data analyzer identifies a transition point (say a plateau reached by the measured fluorescent values) in the chemical reaction, through the analysis, as known in the art.

Optionally, the apparatus 1000 further includes a preference deriver, in communication with the categorizer 160.

The preference deriver derives a preference among the labeling patterns based on an analysis of correlation between the received measurement data and the received data units, as a function of alternative data unit interpretations. Each one of the interpretations is based on a different one of the labeling patterns arrived at.

In one example, in a series of data units each of which includes a string with two digits separated by a single dot such as '1.8', the string may be interpreted as a floating point number (say 1.80). Alternatively, the string may be interpreted as two integer numbers (say 1 and 8).

The first interpretation is preferable if the first interpretation yields a coefficient of determination) R squared) value higher than the second interpretation when the preference deriver runs a linear regression analysis on the data units and the measurement data, as described in further detail hereinbelow.

Optionally, the apparatus further comprises a heuristic data receiver, in communication with the categorizer 160.

The heuristic data receiver receives heuristic data such as one or more rules, from a user of the computer. The rules may be used for the categorizing of the samples by the categorizer 160, for parsing the data units by the parser 120, or for both the parsing and the categorizing, as described in further detail hereinbelow.

In one example, the heuristic data receiver receives a rule that fractional numbers are to be weighted higher and preferred over a combination of two integers. Consequently, a data unit: 'test 3.2' is parsed into an ordered list: 'test', '3.2', rather than into an ordered list: 'test', '3', '2'.

In a second example, the heuristic data receiver receives a rule that a data unit that matches none of the labeling patterns is to be categorized into a general category of specific patterns, and to be forwarded for manual categorization by a worker (say a nurse, a laboratory technician, etc.). Consequently, the control operation initiator creates and sends an e-mail message. In the message, the worker is asked to manually categorize the sample labeled by the data unit that matches none of the labeling patterns.

Optionally, the preference deriver uses the heuristic data received by the heuristic data receiver, in the deriving of preference among the labeling patterns.

Optionally, the preference deriver derives the preference among the labeling patterns by counting the number of data units that match each respective one of the labeling patterns.

Figure 2:
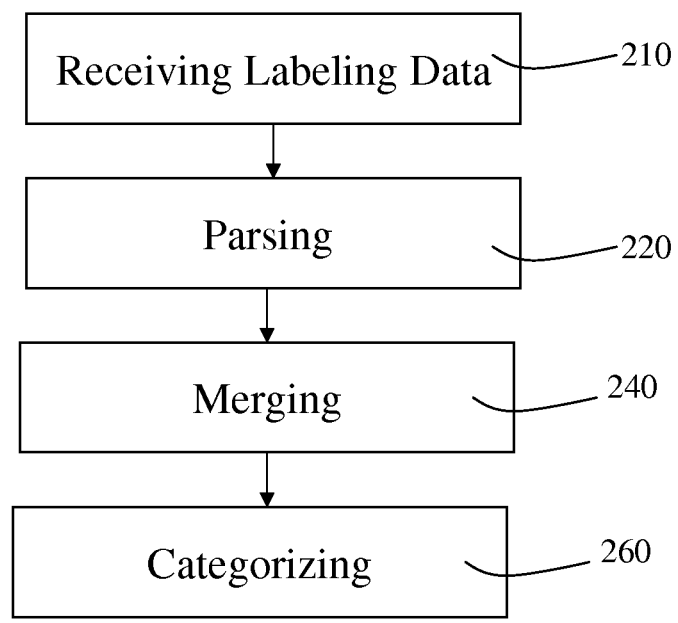
FIG. 2 is a simplified flowchart illustrating a first computer implemented method for automatic categorization of samples, according to an exemplary embodiment of the present invention.

Reference is now made to FIG. 2, which is a simplified flowchart illustrating a first computer implemented method for automatic categorization of samples, according to an exemplary embodiment of the present invention.

A first exemplary method, according to an exemplary embodiment of the present invention, may be implemented on a computer such as a desktop computer, say a desktop computer of a laboratory or a Quality Assurance (QA) department of a food manufacturer. The computer includes a memory, a processor, etc., as known in the art. The computer is programmed to carry out the method's steps described in further detail hereinbelow.

The computer may also be, but is not limited to: a laptop computer, a tablet computer (say an Apple® iPad), a mini tablet computer (say a Samsung® Galaxy Note), a smart phone (say an Apple® iPhone), etc., as known in the art.

The computer may also be a part of a computer device adapted specifically for missions such as testing, say a part of a portable computer device adapted for field testing or for registration of samples collected from subjects in different locations.

In one example, the portable device is adapted for sample collection, through a special design—say a design with several test tube compartments, in which each compartment is assigned a different number (say 1 to 10). Upon insertion of a test tube into one of the compartments, a user of the portable device is prompted to provide data (say a short description) that labels a sample held in the test tube inserted to that compartment. Then, the user provided data is stored as a data unit automatically assigned to the sample in that test tube.

In the first exemplary method, there are received 210 two or more data units, say by the data unit receiver 110. Each one of the data units labels a respective sample of a physical substance such as blood, urine, food, soil, etc., as described in further detail hereinabove.

The samples may be subjected to a chemical reaction, say to PCR (Polymerase Chain Reaction), to a histological examination, or to another form of testing, either before or after the labeling, as described in further detail hereinbelow.

Optionally, each of one or more of the data units comprises natural language description that labels a respective sample, as known in the art.

For example, each data unit may hold labeling data (say a short textual description) used for labeling the sample, by a worker such as a laboratory technician or a nurse, as described in further detail hereinabove.

Only a portion of the workers who label such samples, are expected to follow naming conventions in that labeling, and even then, the conventions tend to vary between different laboratories. In addition, most workers do not always abide fully to the conventions.

Consequently, the data units labeling the samples, particularly when more than one worker is involved in the labeling of the samples, are characterized by a significant lack of uniformity, as described in further detail hereinabove.

Each one of the received 210 data units is parsed 220 into an ordered list of one or more specific tokens, say by the parser 120, as described in further detail hereinabove.

Optionally, the data unit is parsed 220 on string boundaries, say on word boundaries, on number boundaries, on alphanumeric string boundaries, on boundaries defined by blank or certain non-alphanumeric characters, etc., or any combination thereof, as described in further detail hereinbelow.

Optionally, the data unit is parsed 220 by matching to one or more general tokens.

General tokens are general string patterns that are predefined by a user of the computer on which the method is implemented, by a programmer who generates code for implementing the method, etc., say using regular expressions.

A regular expression is a set of pattern matching rules encoded in a string according to certain syntax rules, as known in the art. Regular expressions originate in the UNIX Computer Operating System and are also a part of the Perl Computer Programming Language, as known in the art.

Exemplary regular expressions that may be used for defining the general tokens include but are not limited to strings such as '\d+' that generally defines an integer number, '[−+]?[0-9]*\.?[0-9]*' that generally defines a floating point number, '\w+' that generally defines any string of one or more characters, etc., as described in further detail hereinbelow.

The regular expression used may also be more specific. For example, a user may define a general token, using a regular expression: 'pos', which expression matches specific tokens such as 'pos', 'positive', etc.

Optionally, the data unit is parsed 220 by matching with general tokens, such that each one of different strings of the data unit is identified through matching with a one of the general tokens, as described in further detail hereinbelow.

Thus, each one of the specific tokens that the data unit is parsed 220 into, is a string present in the data unit, and conforming to the pattern defined by one of the general tokens (say using a regular expression), as described in further detail hereinbelow.

Optionally, the parsing 220 is done in a case insensitive manner, and includes converting all uppercase letters into lowercase letters (or vise versa).

For example, a data unit holding the text 'Lambda 212' may be parsed 220 into an ordered list of two specific tokens: 'lambda', '212', through matching with a general token defined using the '\w+' regular expression, and a general token defined using the '\d+' regular expression, respectively.

Optionally, when one of a data unit's strings matches more than one general token, there is selected one of the matched general tokens, say using heuristic data encoded in computer programming code used to implement the parser 120 on the computer, as described in further detail hereinbelow.

The ordered lists that the data units are parsed 220 into, may include one or more subgroups, each of which consists of ordered lists of a same number of specific tokens (say a subgroup that consists of ordered lists of two specific tokens, a subgroup that consists of ordered lists of three specific tokens, etc).

For each one of the subgroups, there are merged 240 at two or more ordered lists, say by the merger 140, provided the ordered lists comply with a merging criterion, as described in further detail hereinbelow.

The merging criterion is applied to each pair of specific tokens of a same order of placement in the ordered list (say the pair of specific tokens each of which is positioned second in the respective one of the ordered lists being merged).

The merging criterion dictates that the pair of specific tokens of the same order of placement is either a pair of identical specific tokens, or a pair of non-identical specific tokens that match a same general token, as described in further detail hereinbelow.

The ordered lists are merged 240 into an ordered list defining a labeling pattern common to the ordered lists being merged 240, as described in further detail hereinbelow.

Optionally, the ordered list resultant upon the merging 240 is otherwise identical to one of the ordered list being merged 240 but with each specific token that belongs to the pair of non-identical specific tokens, being replaced with the general token that matches both specific tokens, as described in further detail hereinbelow.

Consequently, when the ordered list resultant upon the merging 240 is merged 240 with another ordered list, the general token matched by both specific tokens, is treated as a specific token, as described in further detail hereinbelow.

The ordered list resultant upon the merging 240, in turn, may be further merged 240 with any one (or more) of the remaining ordered lists (either an ordered list resultant upon merging 240, or an ordered list resultant upon parsing 220 only), provided the merging criterion is complied with, and so forth, as described in further detail hereinbelow.

Optionally, the merging 240 of ordered lists continues until no more of the subgroup's ordered lists can be merged 240 under the merging criterion.

Optionally, there is further removed duplicity among the ordered lists, say by the merger 140 or by the duplicity remover, as described in further detail hereinbelow. With the duplicity removal, each previously duplicate ordered list appears only once, and none of the ordered lists are identical. Consequently, there is ensured that each ordered list defines a different and unique pattern of labeling.

Finally, each sample may be categorized 260, say by the categorizer 160. The sample is categorized 260 by matching a data unit labeling the sample with at least one of one or more of labeling patterns. Each one of the labeling patterns is defined by a respective one of the ordered lists arrived at after finishing the merging 240, the duplicity removal, or both.

In one example, a data unit is found to match a labeling pattern only if the ordered list defining the labeling pattern and a new ordered list resultant upon parsing the data unit, comply with a matching criterion.

The matching criterion is that each of the new ordered list's specific tokens is either identical to a specific token in a same order of placement in the ordered list defining the labeling pattern, or conforms to a general pattern defined by the specific token in the same order of placement, say to the regular expression in that placement, as described in further detail hereinbelow.

For example, a data unit: 'Seed 4' may be parsed 220 into: 'seed', '4'—an ordered list that matches a labeling pattern defined by the ordered list: 'Seed', "{integer}", where "{integer} denotes a regular expression: '\d+'

Optionally, the categorizing 260 is carried out using heuristic data (say rules) received from a user, heuristic data retrieved from a dictionary based system (say an on line dictionary or thesaurus accessible through the internet), etc., in the matching with the labeling patterns, as described in further detail hereinbelow.

Optionally, a user of the computer may input a category for each of the labeling patterns, say a category that validates each sample categorized 260 to that category as a positive standard, a category that validates each sample categorized 260 to that category for further processing, etc., as described in further detail hereinbelow.

Consequently, the method may further include validating the sample for further processing, according to a result of the categorization 260.

Optionally, results of the validation are conveyed to a user of the computer, by initiating a control operation on a device connected to the computer.

For example, the method may include informing the user via SMS (Short Messages Service), on a sample labeled by a data unit that matches none of the labeling patterns, or on validation of a sample for further processing when the data unit matches one of the labeling patterns.

The categorized 260 sample may be one of the samples labeled by the data units received 210 prior to steps 220-240 that yield the labeling patterns, or rather a new sample labeled by a new data unit that is received later, as described in further detail hereinbelow.

Optionally, the method further comprises receiving measurement data pertaining to one (or more) of the samples labeled by the data units (say physical parameter values such as fluorescence values measured in a reaction chamber during a chemical reaction such as PCR that the samples are subjected to).

The method may further include analyzing the measurement data using the data units, while interpreting each data unit according to the labeling pattern matched by the data unit.

With different interpretations, different results may be arrived to, in that analysis.

For example, a sample labeled by a data unit: 'Pos 23, 5' may be interpreted as a positive sample taken on May 23 when matched with one labeling pattern, and as a positive sample taken at 23.5° C. when matched with another labeling pattern.

Optionally, the analysis may include classifying the sample (say as a negative or positive sample), based on the measurement data, the matched labeling pattern (i.e. the categorization 260), or both.

In one example, the method is implemented a part of a cloud based service, as known in the art.

In the example, the method includes receiving an out-of-sample extension from a remote computer. The out-of-sample extension defines a rule for classifying a sample based on a classification model calculated on the remote computer. Then, the out-of-sample extension is used to classify the samples labeled by the data units, using the measurement data, the matched labeling patterns (i.e. the categorization 260), or both.

Optionally, the classification model is rather calculated on the computer on which the method is implemented, say through Linear Regression, Dimensional Reduction, Kernel PCA (Principal Component Analysis), etc., as known in the art.

Optionally, the method further includes initiating a control operation in a device in communication with the computer on which the method is implemented, upon arrival at a predefined result of the analyzing.

In one example, there may be initiated a control operation (say cooling of a chamber in which the chemical reaction takes place) upon identifying a transition point (say a plateau reached by the measured fluorescent values) in the chemical reaction, through the analysis, as known in the art.

Optionally, the method further includes deriving a preference among the labeling patterns based on an analysis of correlation between the received measurement data and the received 210 data units, as a function of alternative data unit interpretations. Each one of the interpretations is based on a different one of the labeling patterns.

In one example, in a series of data units each of which includes a string with two digits separated by a single dot, such as '1.8', the string may be interpreted as a floating point number (say 1.80). Alternatively, the string may be interpreted as two integer numbers (say 1 and 8).

The first interpretation is preferable if the first interpretation yields a coefficient of determination) R squared) value higher than the second interpretation when running a linear regression analysis on the data units and the measurement data, as described in further detail hereinbelow.

Optionally, there is further received heuristic data such as one or more rules from a user of the computer on which the first exemplary method is implemented. The heuristic data may be used for the categorizing 260 of the samples, for parsing 220 of the data units, or for both the parsing 220 and the categorizing 260, as described in further detail hereinbelow.

In one example, a user inputs a rule that fractional numbers are to be weighted higher and preferred over a combination of two integers. Consequently, a data unit: 'test 3.2' is parsed 220 into an ordered list: 'test', '3.2', rather than into an ordered list: 'test', '3', '2'.

In a second example, a user may input a rule that a data unit that matches none of the labeling patterns is to be categorized into a general category of specific patterns, and to be forwarded for manual categorization by a worker (say a nurse, a laboratory technician, etc.).

The method may thus include deriving a preference among the labeling patterns, using the heuristic data received from the user.

Optionally, the method further includes deriving a preference among the labeling patterns by counting the number of data units that match each respective one of the labeling patterns.

Figure 3:
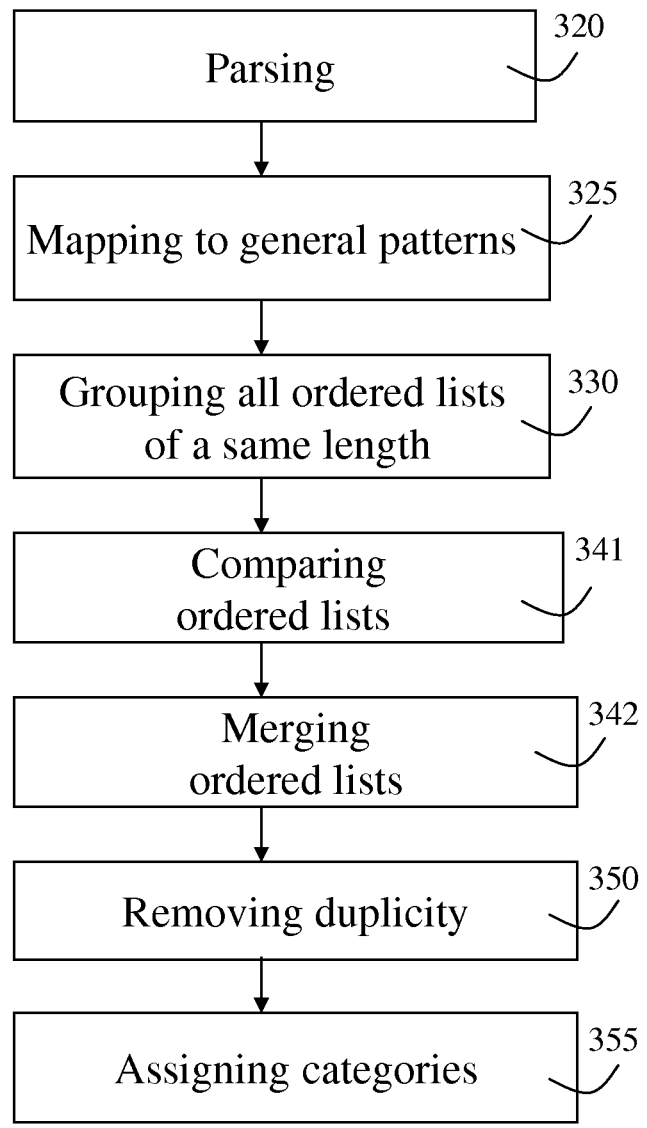
FIG. 3 is a simplified flowchart illustrating a second computer implemented method for automatic categorization of samples, according to an exemplary embodiment of the present invention.

Reference is now made to FIG. 3, which is a simplified flowchart illustrating a second computer implemented method for automatic categorization of samples, according to an exemplary embodiment of the present invention.

A second exemplary method which is an exemplary possible implementation of the above described first method, is implemented on a computer such as a desktop computer, say a desktop computer of a laboratory or a Quality Assurance (QA) department of a food manufacturer, as described in further detail hereinabove.

In the second method, there are received data units, say by the data unit receiver 210, as described in further detail hereinabove. Each one of the data units labels a respective sample of a physical substance (such as soil, blood, etc.), as described in further detail hereinbelow.

In one example, each one of over 10,000 samples held in vials, is tested through one of a variety of chemical reactions and other forms of testing, such as PCR, histological painting and examination, etc., in one of several different laboratories. Each laboratory and even each laboratory technician labels samples differently, as described in further detail hereinabove.

For each one of the samples, the laboratory that tests the sample sends a data unit labelling the sample together with measurement data pertaining to the sample (say readings of a sensor or a medical instrument) in machine readable data files, say in the Microsoft® Excel file format, to a remote computer, for further processing.

The data units labelling the samples, and the measurement data, are received by the data unit receiver 210 that is implemented on the remote computer.

In the instant example, various statistics need to be executed on the samples, say Quality Assurance tests and comparison to dilution control samples, as known in the art.

In the following description, FIG. 5A-5I are used to illustrate an exemplary scenario employing exemplary methods, according to an exemplary embodiment of the present invention. The content and format of the exemplary tables presented in FIG. 5A-5I includes exemplary, non-limiting, illustrative only data units, ordered lists, labeling patterns, categories, etc., according to an exemplary embodiment.

Reference is now made to FIG. 5A, which is a simplified diagram schematically illustrating a first table, according to an exemplary embodiment of the present invention.

Table 510 lists exemplary data units and measurement data of several samples, according to an exemplary embodiment of the present invention.

In one example, samples that are labelled as shown in the column entitled 'Sample Name' of the table 510 and that are associated with measurement data as shown under the column entitled 'Sensor Readings', are supposed to be categorized as shown in the column entitled 'Sample Category'. Further, for some of the samples, the labelling includes a numerical string that needs to be interpreted as a numerical property shown in the column entitled 'Property', in order to derive certain statistics from the measurement data and the numerical properties.

One way to arrive at such categorization and numerical properties is using labelling patterns (that may also be referred to as filter patterns). Optionally, the labelling patterns are defined using regular expressions, as described in further detail hereinabove.

Reference is now made to FIG. 5B, which is a simplified diagram schematically illustrating a second table, according to an exemplary embodiment of the present invention.

Exemplary labelling patterns that may prove useful for categorising samples and interpreting data units that label the samples of the table 510 of FIG. 5A accurately, are shown in the table 520 presented in FIG. 5B. In the table 520, each row corresponds to one labelling pattern defined using a respective regular expression.

Each one of the labelling patterns shown in the column entitled 'Pattern', corresponds to a category as shown in the column entitled 'Category'. Some of the labelling patterns include a part that may match a numerical string, as shown in the column entitled 'Numerical'.

Thus, for example, the sample that corresponds to the fourth row in the table 510 shown in FIG. 5A, is labelled with a data unit: 'DILL0.5', which matches the labelling pattern that occupies the third row in table 520 that is presented in FIG. 5B (i.e. '^dill\W*(\d+)').

Consequently, based on the matching, the sample is categorized as a Dilution Control Sample, with a numerical property: '0.5' which stands for a 0.5 concentration (as apposed, for example, to a 0.05 concentration of the sample that corresponds to the fifth row of the table 510 shown in FIG. 5A).

The second exemplary method, may thus serve to automatically create one or more labelling patterns. Each one of the labelling patterns is defined by an ordered list made of regular expressions, such as the regular expressions of the column entitled 'Pattern', in the table 520 presented in FIG. 5B, hereinabove.

Once creating the ordered lists, a user may be prompted to input a category for the labelling pattern defined by each one of the ordered lists, as described in further detail hereinbelow.

In one example, a user may is presented the ordered list (i.e. the regular expressions in that ordered list) and allowed to input a category for the labelling pattern defined by the ordered list that is presented to the user.

In another example, the user is presented an exemplary data unit that matches the labelling pattern and is allowed to input a category for the labelling pattern matched by the exemplary data unit.

In yet another example, the category may be designated automatically to each labelling pattern, based on heuristics, say on a rule of thumb that 'POS' usually denotes a positive sample. The heuristics may be encoded as a part of a computer programming code used to implement the method, be input from a user, be extracted from an external dictionary-based system, etc., as described in further detail hereinabove.

Optionally, the method further includes calculating a correlation between measurement data obtained for each sample, and numerical properties extracted from the data unit labelling the sample. Then, the calculated correlation is used for choosing a labelling for the sample, among two or more alternative labelling patterns, as described in further detail hereinabove.

In one example, there may is calculated a quality of a linear fit between logarithms of numerical properties (say dilution factors) that are arrived at by parsing the data units, and elbow points in sigmoid graphs that depict measured kinetic data such as fluorescence measured during a PCR reaction involving each of the samples, as described in further detail hereinbelow.

Reference is now returned to FIG. 3.

Each one of the received data units is parsed 320 into an ordered list of one or more specific tokens, say by the parser 120, as described in further detail hereinabove.

Optionally, the data unit is parsed 320 on string boundaries, say on word boundaries, on number boundaries, on alphanumeric string boundaries, on boundaries defined by blank or certain non-alphanumeric characters (say '-'), etc., or any combination thereof, as described in further detail hereinabove.

Optionally, the data unit is parsed 320 by matching to one or more general tokens.

General tokens are general string patterns that are predefined by a user of the computer on which the method is implemented, by a programmer who generates code for implementing the method, etc., say using regular expressions.

A regular expression is a set of pattern matching rules encoded in a string according to certain syntax rules, as known in the art. Regular expressions originate in the UNIX Computer Operating System and are also a part of the Perl Computer Programming Language, as known in the art.

Optionally, the data unit is parsed 320 by matching with general tokens, such that each one of different strings of the data unit is identified through matching with a one of the general tokens, as described in further detail hereinbelow.

Each one of the data unit's strings that conforms to a general string pattern defined by the regular expression of a general token is identified as a specific token.

Consequently, the data unit is parsed into an ordered list made of the specific tokens thus identified, arranged in a same order as the strings in the data unit.

Reference is now made to FIG. 5C, which is a simplified diagram schematically illustrating a third table, according to an exemplary embodiment of the present invention.

An example for the parsing 320 is now illustrated using a table 530 presented in FIG. 5C, in which each data unit is presented in one or more rows, under the column entitled 'Sample Name'.

Specifically, each one of the data units may be parsed 320 into one or more ordered lists of specific tokens.

In the table 530, each of the ordered lists is presented under the column entitled 'Ordered List', in one row, by side of the data unit that may be parsed 320 to the ordered list.

Thus, a data unit that may be parsed 320 into one ordered list occupies one row of the table 530, a data unit that may be parsed 320 into two alternative ordered lists occupies two rows of the table 530, etc.

Figure 5D:
FIG. 5D is a simplified diagram schematically illustrating a fourth table, according to an exemplary embodiment of the present invention.

Reference is now made to FIG. 5D which is a simplified diagram schematically illustrating a fourth table, according to an exemplary embodiment of the present invention.

Each of the data units of table 530 may be parsed 320 into the ordered list, using the table 540 presented in FIG. 5D, in which each row corresponds to one general token.

In the table 540, each general token is named as shown in the column entitled 'General Token' and is defined by the regular expression shown in the column entitled 'Regular Expression'. The column entitled 'Match' gives an exemplary string that would match the general token.

Each one of the order list's specific tokens matches at least one of the regular expressions.

Thus, for example, the data unit 'DILL 5E−3' occupies two rows in the table 530 presented in FIG. 5C. One in which the ordered list resultant upon parsing the data unit is: "dill", "5e−3", and one in which the ordered list resultant upon parsing the data unit is: "dill", "5", "e" "−3".

Reference is now returned to FIG. 3.

Optionally, each of the ordered lists is mapped 325 to the general tokens matching the ordered list's specific tokens, say using a data structure (say a table in a relational database, as known in the art) that implements one of the tables illustrated in FIGS. 5E and 5F, as described in further detail hereinbelow.

Figure 5E:
FIG. 5E is a simplified diagram schematically illustrating a fifth table, according to an exemplary embodiment of the present invention.

Reference is now made to FIG. 5E, which is a simplified diagram schematically illustrating a fifth table, according to an exemplary embodiment of the present invention.

One way to map between data units and ordered lists that the data units may be parsed into, is using a table in which each combination of a specific data unit and a specific ordered list is presented in a separated row.

Table 550's column entitled 'Sample Name' shows exemplary data units. Each of the data units shown in the table 550, labels a different sample. Each one of the data units shown in the table 550 may be parsed into one or more ordered lists. A data unit that may be parsed into two ordered lists appears twice (once per each ordered list) in the table 550.

Each of the ordered lists occupies one of the rows in the column entitled 'Specific' and is mapped 325 to a corresponding set of general tokens.

The set of general token is shown in the same row as the order list, in the column entitled 'General'. Each one of the mapped 325 ordered list's specific tokens matches the general token in a same order of positioning in the set shown in the order list's row.

Reference is now made to FIG. 5F, which is a simplified diagram schematically illustrating a sixth table, according to an exemplary embodiment of the present invention.

Another way to map between data units and ordered lists that the data units may be parsed into, is using a table in which all ordered list that a specific data unit may be parsed into, are presented in a same row as the data unit's.

In one example that is now made with reference to the table 560 presented in FIG. 5F, each data unit is parsed 320 into specific tokens on string boundaries, say on word boundaries, on number boundaries, on alphanumeric string boundaries, on boundaries defined by blank or certain non-alphanumeric characters, etc.

However, some of the specific tokens may match two or more general tokens, rather than a single general token. Consequently, the ordered list is mapped to two or more alternative ordered lists of general tokens, as shown for example, in the data unit's row, in the columns entitled 'General 1' and 'General 2'.

For example, a data unit 'DILL 0.5 is parsed 320 into a single ordered list: 'dill', '0.5', on a word boundary basis.

The specific token '0.5' in turn, may match either a single general token that represents a floating point number (0.5), or two general tokens that represent integer numbers (0 and 5). Consequently, the ordered list may be mapped to either one of two alternative ordered lists of general tokens, as shown in the data unit's row, in the columns entitled 'General 1' and 'General 2'.

Reference is now returned to FIG. 3.

Next, there are grouped 330 all ordered lists of a same length (i.e. a same number of specific tokens) into subgroups. That is to say that the ordered lists are grouped 330 into one or more subgroups, and that each one of the subgroups consists of ordered lists with a same number of specific tokens.

Next, in each one of the subgroups, there are compared 341 at least two ordered lists, say in pairs or in triplets of ordered lists, say by the merger 140, as described in further detail hereinabove.

Optionally, the ordered lists are compared 341, using information obtained by the mapping 325 of the ordered lists to general tokens, say a table of the sort illustrated in FIG. 5E or FIG. 5F, as described in further detail hereinabove.

Only compared ordered lists in which each pair of specific tokens of a same order of placement in the ordered list (say the pair of specific tokens each of which is positioned second in the respective ordered list) complies with a merging criterion, are merged 342.

The criterion is that the two specific tokens of the pair are either a pair of identical specific tokens, or are a pair of non-identical specific tokens that are both matched by a same general token, as described in further detail hereinabove.

The ordered lists are merged 342 into an ordered list that defines a labeling pattern common to the ordered lists that are merged 342, as described in further detail hereinbelow.

Optionally, the ordered list resultant upon the merging 342 is otherwise identical to one of the ordered list being merged 342 but with each specific token that belongs to the pair of non-identical specific tokens, being replaced with the general token matching both specific tokens, as described in further detail hereinbelow.

The ordered list resultant upon the merging 342, in turn, may be further merged 342 with any one (or more) of the remaining ordered lists (either an ordered list resultant upon merging 342, or an ordered list resultant upon parsing 320 only), provided the merging criterion is complied with, and so forth, as described in further detail hereinbelow.

Optionally, the merging 342 of compared 341 ordered lists that are compliant with the merging criterion, continues until no more of the subgroup's ordered lists can be merged 342 under the merging criterion.

In one example, two samples are labeled by the respective 'Dill#1: 0.05' and 'Dill#1: 5e-3' data units. The first data unit is parsed 320 into a first ordered list: 'dill', '1', '0.05' and the second data unit is parsed 320 into a second ordered list: 'dill', '1', '5e-3'.

The specific token positioned first in the first ordered list and the specific token positioned first in the second ordered list are identical ('dill').

The specific token positioned second in the first ordered list and the specific token positioned second in the second ordered list are also identical ('1').

The specific token ('0.05') positioned third in the first ordered list and the specific token ('5e-3') positioned third in the second ordered are non-identical.

However, the specific token ('0.05') positioned third in the first ordered list matches a general token denoted '{scientific}' that the specific token ('5e-3') positioned third in the second ordered list also matches.

The regular expression that defines the general token denoted '{scientific}', in the present example, can be found in the fourth row and third column of the table 540 presented in FIG. 5D.

Since in the pair of ordered lists, all specific tokens of a same order of placement are either identical, or non-identical specific tokens that match a common general token, the first and second ordered lists are merged 342, say by the merger 140, as described in further detail hereinabove.

The ordered list resultant upon the merging 342 is: 'dill', '1', '{scientific}'.

The resultant ordered list is otherwise identical the first ordered list, but with the third specific token ('0.05') being replaced with the common general token ('{scientific}') that matches both specific tokens that are positioned third.

Consequently, when the ordered list resultant upon the merging 342 is compared 341 and merged 342 with another ordered list, the common general token is treated as a specific token, as described in further detail hereinbelow.

In a following, second example, the ordered list: 'dill', '1', '{scientific}', which is resultant upon the merging of the two ordered lists of the previous example, and is also referred to hereinbelow as the 'united ordered list', is compared 341 with a third ordered list: 'dill', '2', '2000' that is resultant upon the parsing 320 of a data unit: 'Dill#2: 2000'.

The specific token positioned first in the united ordered list and the specific token positioned first in the third ordered list are identical ('dill').

The specific token ('1') positioned second in the united ordered list and the specific ordered ('2') positioned second in the third ordered list are non-identical. However, both specific tokens match a common general token '{integer}'.

The regular expression that defines the general token denoted '{integer}', in the present example, can be found in the third row and third column of the table 540 presented in FIG. 5D.

Similarly, the specific token ('2000') positioned third in the third ordered list and the now specific token ('{scientific}') positioned third in the united ordered list are non-identical. However, both specific tokens match the common general token '{scientific}'.

Since in the pair of ordered lists, all specific tokens of a same order of placement are either identical, or non-identical specific tokens that match a common general token, the united and third ordered lists are merged 342, say by the merger 140, as described in further detail hereinabove.

The ordered list resultant upon the merging 342 is: 'dill', '{integer}', '{scientific}'.

Optionally, there is further removed 350 duplicity among the ordered lists, say by the merger 140 or by the duplicity remover, as described in further detail hereinabove. With the duplicity removal, each previously duplicate ordered list appears only once, and none of the ordered lists are identical. Consequently, there is ensured that each ordered list defines a different and unique pattern of labeling.

The removal of duplicates is illustrated in an example discussed in further detail hereinbelow, using FIGS. 5G and 5H, as described in further detail hereinbelow.

Reference is now made to FIG. 5G, which is a simplified diagram schematically illustrating a seventh table, according to an exemplary embodiment of the present invention.

Table 570 lists exemplary labeling patterns denoted in the table 570 as Labeling Pattern 1-8.

The table 570 further holds the ordered list that defines each of the labeling patterns (in the column entitled 'Ordered List') and a set of general tokens for each labeling pattern (in the column entitled 'General Tokens').

Upon the removal 350 of duplicity among the ordered lists, each previously duplicate ordered list appears only once, and none of the ordered lists are identical. Consequently, there is ensured that each ordered list defines a different and unique pattern of labeling.

For the removal 350, each group of labeling patterns that are defined by identical ordered lists as left after the merging 342 but one, are removed 350.

Figure 5H:
FIG. 5H is a simplified diagram schematically illustrating an eighth table, according to an exemplary embodiment of the present invention.

Reference is now made to FIG. 5H, which is a simplified diagram schematically illustrating an eighth table, according to an exemplary embodiment of the present invention.

Table 580 lists the labeling patterns remaining after the removal 350 of duplicity among the ordered lists of Table 570. Each of the remaining ordered lists thus defines a unique labeling pattern.

The unique labeling patterns are denoted in Table 580 as Unique Pattern 1-5. The table 580 further holds the ordered list that defines each of the (now unique) labeling patterns, in the column entitled 'Ordered List'.

Reference is now returned to FIG. 3.

In the next step, there is assigned 355 a category to each one the labelling patterns.

Optionally, a user may be prompted to input a category for the labelling pattern defined by each one of the ordered lists, as described in further detail hereinbelow.

In one example, the user is presented a regular expression made of the specific tokens (and hence of the regular expressions that define the specific tokens), and is allowed to input a category for the labelling pattern defined using the regular expression.

In another example, the user is shown an exemplary data unit that matches the labelling pattern and is allowed to input a category for the labelling pattern matched by the exemplary data unit.

In yet another example, the category may be assigned 355 automatically to each labelling pattern, based on heuristics, say a rule of thumb that 'POS' usually denotes a positive sample. The heuristics may be encoded as a part of a computer programming code used to implement the method, input from a user, extracted from an external dictionary-based system, etc., as described in further detail hereinbelow.

Optionally, the method further includes deriving a preference among the labelling patterns, as described in further detail hereinabove.

Optionally, there is derived a preference among the labeling patterns, say using heuristic data (say rules of thumb) received from a user.

Optionally, the preference is derived using an analysis of correlation between measurement data received for the data units and the data units, as a function of alternative data unit interpretations. Each one of the interpretations is based on a different one of the labeling patterns arrived at.

In one example, in a series of data units each of which includes a different string with two digits separated by a single dot, such as '1.35', the string may be interpreted as a floating point number (say 1.35), according to one labeling pattern. Alternatively, the string may be interpreted as two integer numbers (say 1 and 35), according to a second labeling pattern.

In the example, the first interpretation yields a coefficient of determination) R squared) value higher than the second interpretation when running a linear regression analysis on the data units and the measurement data, as described in further detail hereinabove. Consequently, the first labeling pattern is preferred over the second labeling pattern.

Figure 5I:
FIG. 5I is a simplified diagram schematically illustrating a ninth table, according to an exemplary embodiment of the present invention.

A second example for the analysis is presented using FIG. 5I which is a simplified diagram schematically illustrating a ninth table, according to an exemplary embodiment of the present invention.

In the second example, as shown in a table 590, each one of a series of samples is labeled by a data unit.

Each data unit occupies one or more rows in the column entitled 'Data unit', depending on the number of labeling patterns that may mach the data unit. For example, the first two rows of the table 590 are occupied by a data unit: 'Dill1: 0.5', which may be matched with either labeling patterns shown in those two rows, in the column entitled 'Candidate Labeling Pattern'.

Each of the samples is subjected to a PCR reaction that yields measurement data such as the exemplary Cq values in the column entitled 'Measured Cq".

From each one of the data units, there is extracted a value as shown in the column entitled 'value from labeling'. The extracted value depends on the labeling pattern matching the data unit.

As shown, the data unit 'Dill1: 0.5' occupies two rows of the table 590, since the data unit may match any one of the labeling patterns in the first two rows.

A linear regression analysis is run on the Cq values (i.e. the measurement data) and the values extracted from all data units, with the value 0.5 being extracted for the 'Dill1: 0.5' data unit, according to the labeling pattern in the first row of Table 590 (i.e. a one based on a scientific interpretation for '0.5').

A linear regression analysis in also run on the Cq values and the values extracted from all data units, with the numbers 0 and 5 being extracted for the "Dill1: 0.5' data unit, according to the labeling pattern in the second row of the table 590 (i.e. a one based on an integer interpretation for '0.5').

The first linear regression run yields better R Square values.

Consequently, there is decided that the labeling pattern in the first row (i.e. the one based on a scientific interpretation for the data unit, and the number '0.5' in particular) is preferable over the labeling pattern in the second row.

Thus, there is decided that the data unit 'Dill1: 0.5' matches the labeling pattern in the first row rather than the labeling pattern in the second row.

Figure 4:
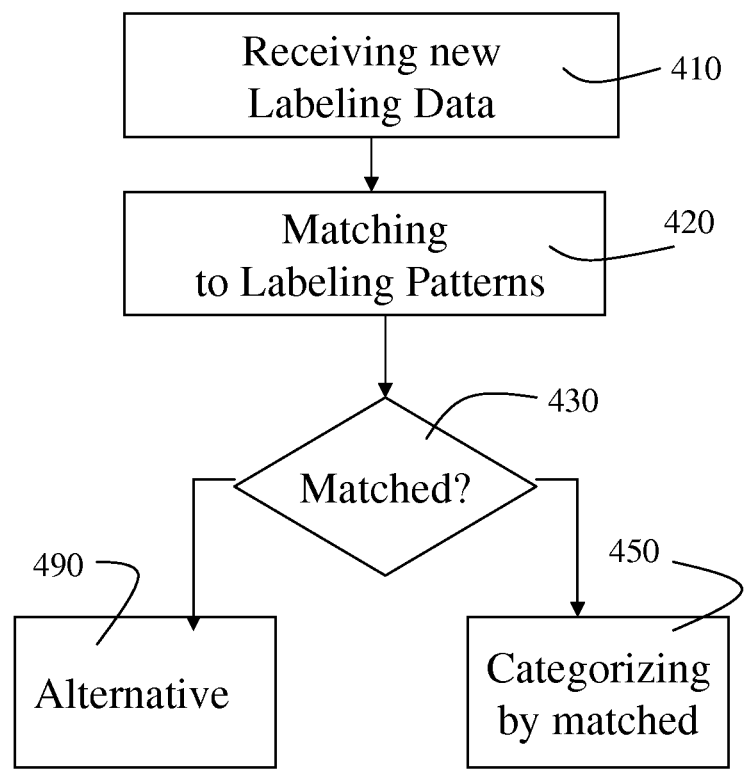
FIG. 4 is a simplified flowchart illustrating a third computer implemented method for automatic categorization of samples, according to an exemplary embodiment of the present invention.

There may be other reasons for deriving the preference between the two labeling patterns. For example, the preference may be derived according to a rule of thumb input by a user (say that labeling patterns based on scientific expression should be given higher weight than labeling patterns based on integer expressions, etc.), Reference is now made to FIG. 4, which is a simplified flowchart illustrating a third computer implemented method for automatic categorization of samples, according to an exemplary embodiment of the present invention.

A third exemplary method which is an exemplary possible implementation of the above described first method's step of categorization 260, is implemented on a computer such as a desktop computer, say a desktop computer of a laboratory or a Quality Assurance (QA) department of a food manufacturer, as described in further detail hereinabove.

In the third exemplary method, when a new data unit is received 410, say by the data unit receiver 110, there is made an attempt to find a match 420 for the new data unit, among the labeling patterns resultant upon the merging 240 of the ordered lists (and optionally, the removal of duplicity), as described in further detail hereinabove.

In one example, a data unit is found to match a labeling pattern if the ordered list that defines the labeling pattern and a new ordered list resultant upon parsing the new data unit, comply with a matching criterion.

The matching criterion is that each of the new ordered list's specific tokens is either identical to a specific token in a same order of placement in the ordered list defining the labeling pattern, or conforms to a general pattern defined by the specific token in the same order of placement, say to the regular expression in that placement.

For example, a data unit: 'Seed 4' may be parsed into: 'seed', '4'—an ordered list that matches a labeling pattern defined by the ordered list: 'Seed', "{integer}", where "{integer} denotes a regular expression: '\d+', as described in further detail hereinabove.

Upon arrival 430 at a conclusion that the new data unit matches one of the labeling patterns, the new data unit may be categorized 450, say as corresponding to a category of positive standard samples, to a category that validates for further processing, etc., as described in further detail hereinabove.

Upon arrival 430 at a conclusion that the new data unit matches none of the labeling patterns, there may be carried out an alternative step 490, instead of the categorization 450 by matching.

The alternative step 490 may include, but is not limited to: categorizing the sample to default category of specific labeling, re-calculation of the labeling patterns through steps 210-240 of the first method, informing a user of the computer (say by SMS), etc., or any combination thereof, as described in further detail hereinabove.

Figure 6:
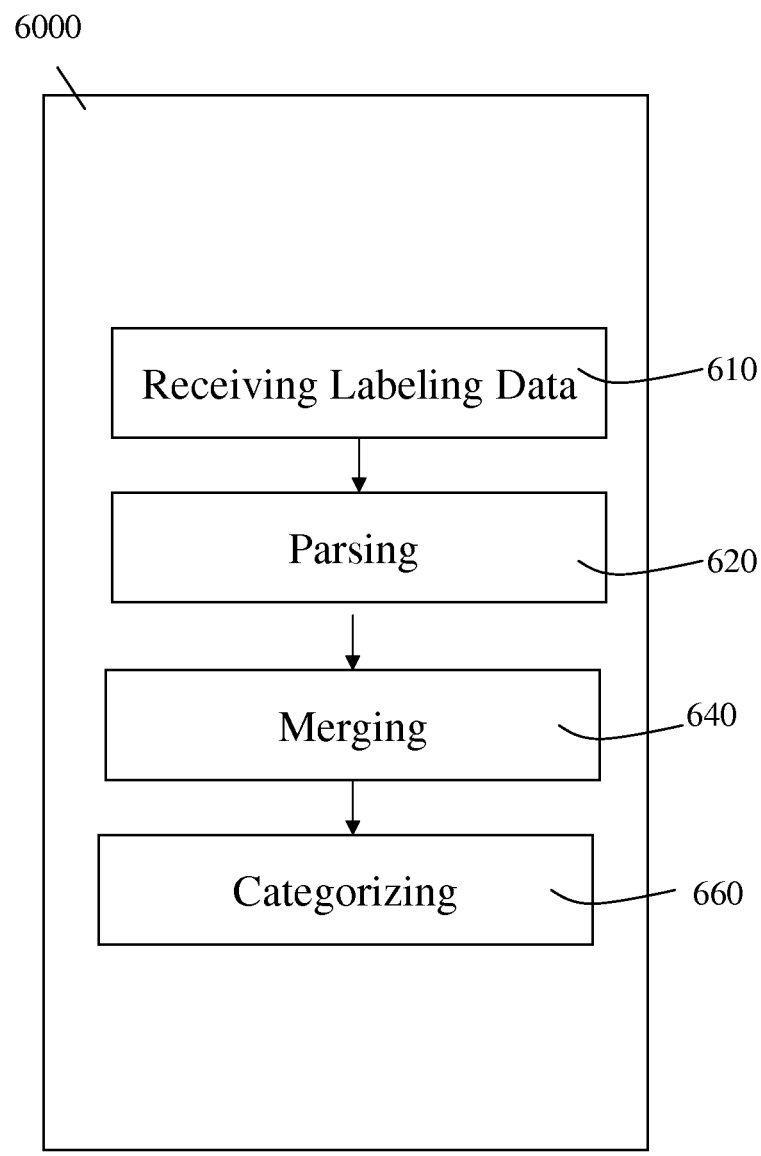
FIG. 6 is block diagram schematically illustrating a computer readable medium storing computer executable instructions for performing steps of automatic categorization of samples, according to an exemplary embodiment of the present invention.

Reference is now made to FIG. 6, which is block diagram schematically illustrating a computer readable medium storing computer executable instructions for performing steps of automatic categorization of samples, according to an exemplary embodiment of the present invention.

According to an exemplary embodiment of the present invention, there is provided a computer readable medium 6000, such as a CD-ROM, a USB-Memory, a Portable Hard Disk, a diskette, etc., as known in the art.

The computer readable medium 6000 is a non-transitory medium that stores computer executable instructions, for performing steps of automatic categorization of samples.

The steps may be executed upon a processor of a computer such as a desktop computer, say a desktop computer of a laboratory or a Quality Assurance (QA) department of a food manufacturer.

The computer may also be, but is not limited to: a laptop computer, a tablet computer (say an Apple® iPad), a mini tablet computer (say a Samsung® Galaxy Note), a smart phone (say an Apple® iPhone), etc., as known in the art.

The computer may also be a part of a computer device adapted specifically for missions such as testing, as described in further detail hereinabove.

The computer executable instructions include a step of receiving 610 two or more data units. Each one of the data units labels a respective sample of a physical substance such as blood, urine, food, soil, etc., as described in further detail hereinabove.

The samples may be subjected to a chemical reaction, say to PCR (Polymerase Chain Reaction), to a histological examination, or to another form of testing, either before or after the labeling, as described in further detail hereinbelow.

Optionally, one or more of the data units comprises natural language description that labels the respective sample, as known in the art.

For example, each data unit may hold data (say a short textual description) that is used for labeling a specific sample, by a worker such as a laboratory technician or a nurse, as described in further detail hereinabove.

Only a portion of the workers who label such samples, are expected to follow naming conventions in that labeling, and even then, the conventions tend to vary between different laboratories. In addition, most workers do not always abide fully to the conventions.

Consequently, the data units labeling the samples, particularly when more than one worker is involved in the labeling of the samples, are characterized by a significant lack of uniformity, as described in further detail hereinabove.

The computer executable instructions further include a step of parsing 620 each one of the received 610 data units into an ordered list of one or more specific tokens, as described in further detail hereinabove.

Optionally, the data unit is parsed 620 on string boundaries, say on word boundaries, on number boundaries, on alphanumeric string boundaries, on boundaries defined by blank or certain non-alphanumeric characters, etc., or any combination thereof, as described in further detail hereinabove.

Optionally, the data unit is parsed 620 by matching to one or more general tokens, as described in further detail hereinabove.

General tokens are general string patterns that are predefined by a user of the computer, by a programmer who generates the computer executable instructions, etc., say using regular expressions.

A regular expression is a set of pattern matching rules encoded in a string according to certain syntax rules, as known in the art. Regular expressions originate in the UNIX Computer Operating System and are also a part of the Perl Computer Programming Language, as known in the art.

Optionally, the data unit is parsed 620 by matching with general tokens, such that each one of different strings of the data unit is identified through matching with a one of the general tokens, as described in further detail hereinbelow.

Thus, each one of the specific tokens that the data unit is parsed 620 to, is a string that is present in the data unit and that conforms to a pattern defined by one of the general tokens (say using a regular expression), as described in further detail hereinabove.

Optionally, the parsing 620 is done in a case insensitive manner, and includes converting all uppercase letters into lowercase letters (or vise versa).

For example, a data unit holding the text 'Lambda 212' may be parsed 620 into an ordered list of two specific tokens: 'lambda', '212', through matching with a general token defined using the '\w+' regular expression, and a general token defined using the '\d+' regular expression, respectively.

Optionally, when one of a label unit's strings matches more than one general token, there is selected one of the matched general tokens, say using heuristic data encoded in computer programming code used to implement the step of parsing 620 on the computer, as described in further detail hereinabove.

The ordered lists that the data units are parsed 620 into, may include one or more subgroups, each of which consists of ordered lists of a same number of specific tokens (say a subgroup that consists of ordered lists of two specific tokens, a subgroup that consists of ordered lists of three specific tokens, etc.).

The computer executable instructions further include a step of merging 640, for each one of the subgroups, at least two ordered lists, provided the ordered lists comply with a merging criterion, as described in further detail hereinbelow.

The merging criterion is applied to each pair of specific tokens of a same order of placement in the ordered list (say the pair of specific tokens each of which is positioned second in the respective one of the ordered lists being merged 640).

The merging criterion dictates that the pair of specific tokens of the same order of placement is either a pair of identical specific tokens, or a pair of non-identical specific tokens that match a same general token, as described in further detail hereinbelow.

The ordered lists are merged 640 into an ordered list defining a labeling pattern common to the ordered lists that are merged 640, as described in further detail hereinabove.

Optionally, the ordered list resultant upon the merging 640 is otherwise identical to one of the ordered list being merged 640 but with each specific token that belonging to the pair of non-identical specific tokens, being replaced with the common general token matching both specific tokens, as described in further detail hereinabove.

The ordered list resultant upon the merging 640, in turn, may be further merged 640 with any one (or more) of the remaining ordered lists (either an ordered list resultant upon merging 640, or an ordered list resultant upon parsing 620 only), provided the merging criterion is complied with, and so forth, as described in further detail hereinabove.

Consequently, when the ordered list resultant upon the merging 640 is merged 640 with another ordered list, the common general token is treated as a specific token, as described in further detail hereinabove.

Optionally, the merging 640 of ordered lists continues until no more ordered lists can be merged 640 under the merging criterion.

Optionally, the computer executable instructions further include a step of removing duplicity among the ordered lists, as described in further detail hereinabove.

With the duplicity removal, each previously duplicate ordered list appears only once, and none of the ordered lists are identical. Consequently, there is ensured that each ordered list defines a different and unique pattern of labeling.

The computer executable instructions further include a step of categorizing 660 a sample.

The sample is categorized 660 by matching a data unit labeling the sample with at least one of one or more of labeling patterns. Each one of the labeling patterns is defined by a respective one of the ordered lists arrived at after finishing the merging 640, the duplicity removal, or both.

Optionally, the computer executable instructions further include a step of allowing a user of the computer to input a category for each of the labeling patterns. For example, the user may input a category that validates each sample categorized 660 to that category as a positive standard, a category that validates each sample categorized 660 to that category for further processing, etc., as described in further detail hereinabove.

Optionally, the computer executable instructions further include a step of validating the sample for further processing, according to a result of the categorization 660.

Optionally, the computer executable instructions include a step conveying results of the validation to a user of the computer, by initiating a control operation on a device connected to the computer, as described in further detail hereinabove.

For example, the computer executable instructions may include a step of informing a user via SMS, on a sample labeled by a data unit that matches none of the labeling patterns, or on validation of a sample for further processing when the data unit matches one of the labeling patterns.

The categorized 660 sample may be one of the samples labeled by the data units received 610 prior to executing the instructions 620-640 that yield the labeling patterns, or rather a new sample labeled by a data unit received later (i.e. a new data unit), as described in further detail hereinabove.

Optionally, the computer executable instructions further include a step of receiving measurement data pertaining to one (or more) of the samples labeled by the data units (say physical parameter values such as fluorescence values measured in a reaction chamber during a chemical reaction that the sample is subjected to).

The computer executable instructions may include a step analyzing the measurement data using the data units, while interpreting each data unit according to the labeling pattern matched by the data unit.

With different interpretations, the analysis yields different results.

For example, a sample labeled by a data unit: 'Pos 23, 5' may be interpreted as a positive sample taken on May 23 when matched with one labeling pattern, and as a positive sample taken at 23.5° C. when matched with another labeling pattern.

Optionally, the analysis may include classifying the sample (say as a negative or positive sample), based on the measurement data, the matched labeling pattern (i.e. the categorization 660), or both.

In one example, the steps are implemented a part of a cloud based service, as known in the art.

In the example, the computer executable instructions include a step of receiving an out-of-sample extension from a remote computer. The out-of-sample extension defines a rule for classifying a sample based on a classification model calculated on the remote computer. Then, the out-of-sample extension is used to classify the samples labeled by the data units, using the measurement data, the matched labeling patterns (i.e. the categorization 660), or both.

Optionally, the computer executable instructions include a step of calculating the classification model on the computer, say through Linear Regression, Dimensional Reduction, Kernel PCA (Principal Component Analysis), etc., as known in the art.

Optionally, the computer executable instructions include a step of initiating a control operation in a device in communication with the computer, upon arrival at a predefined result of the analyzing.

In one example, there may be initiated a control operation (say cooling of a chamber in which the chemical reaction takes place) upon identifying a transition point (say a plateau reached by the measured fluorescent values) in the chemical reaction, through the analysis, as known in the art.

Optionally, the computer executable instructions further include a step of deriving a preference among the labeling patterns based on an analysis of correlation between the received measurement data and the received 610 data units labeling the samples, as a function of alternative data unit interpretations. Each one of the interpretations is based on a different one of the labeling patterns.

In one example, a first interpretation is preferable over a second one, if the first interpretation yields a coefficient of determination (R Squared) value higher than the second interpretation when running a linear regression analysis on the series of data units and measurement data thereof, as described in further detail hereinabove.

Optionally, the computer executable instructions further include a step of receiving heuristic data (say one or more rules) from a user of the computer. The heuristic data may be used for the categorizing 660 of the samples, for parsing 620 of the data units labeling the samples, or for both the parsing 620 and the categorizing 660, as described in further detail hereinabove.

For example, a user may input a rule that a data unit that matches none of the labeling patterns is to be categorized into a general category of specific patterns, and to be forwarded for manual categorization by a worker (say a nurse, a laboratory technician, etc.).

Optionally, the computer executable instructions include a step of deriving a preference among the labeling patterns, using the heuristic data received from the user.

In one example, a user inputs a rule that fractional numbers are preferable over a combination of two integers. Consequently, a data unit: 'test 3.2' is parsed 220 into an ordered list: 'test', '3.2', rather than into an ordered list: 'test', '3', '2'.

Optionally, the computer executable instructions include a step of deriving a preference among the labeling patterns by counting the number of data units that match each respective one of the labeling patterns.

It is expected that during the life of this patent many relevant devices and systems will be developed and the scope of the terms herein, particularly of the terms "Computer", "Tablet", "Mini-tablet", "Smart Phone", "SMS", and "PCR", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method for automatic categorization of samples according to learnt patterns of labeling, the method comprising steps a computer is programmed to perform, the steps comprising:
   a) on a computer, receiving a plurality of data units labeling a plurality of physical substance samples such that each one of the data units labels only a respective one of the physical substance samples and each one of the physical substance samples is labeled by only one of the data units;
   b) parsing each one of the data units into at least one respective ordered list of one or more specific tokens;
   c) for at least one subgroup of said ordered lists, the subgroup consisting of ordered lists of a same number of specific tokens, merging at least two ordered lists in which each pair of specific tokens of a same order of in-ordered-list positioning are at least one of a group consisting of: a pair of identical specific tokens, and a pair of non-identical specific tokens matching a same general token, into an ordered list defining a labeling pattern common to the ordered lists being merged and therefore to more than one of the labeled physical substance samples, the ordered list defining the labeling pattern by including the general token in place of the specific tokens matching the general token; and
   d) categorizing a sample by matching a data unit labeling the sample being categorized, to at least one of the labeling patterns, the matching being based on a matching criterion, the matching criterion being that each specific token included in an ordered list that is a result of parsing the data unit labeling the sample being categorized, is either identical to a token that is of a same order of in-ordered-list positioning and is included in the ordered list that defines the labeling pattern, or is in conformity to a general pattern defined by the token of the same order of in-ordered-list positioning.

2. The method of claim 1, further comprising ensuring uniqueness of the ordered lists by removing duplicity among the ordered lists.

3. The method of claim 1, wherein the ordered list defining the common pattern is otherwise identical to one of the ordered lists being merged but with each specific token belonging to the pair of non-identical specific tokens, being replaced with the general token.

4. The method of claim 1, further comprising validating a sample for further processing, according to a result of matching to one of the labeling patterns.

5. The method of claim 1, further comprising receiving measurement data pertaining to the samples labeled by the data units, and deriving a preference among the labeling patterns through an analysis of correlation between the received measurement data and data units as a function of alternative data unit interpretations, each one of the interpretations being based on a different one of the labeling patterns.

6. The method of claim 1, further comprising receiving heuristic data from a user, and using the heuristic data for at least one of said categorizing and said parsing.

7. The method of claim 1, further comprising deriving a preference among the labeling patterns according to a count of data units matching each respective one of the labeling patterns.

8. The method of claim 1, wherein at least one of the general tokens is based on a regular expression.

9. The method of claim 1, wherein said parsing comprises using at least one general token.

10. The method of claim 1, further comprising receiving measurement data pertaining to the samples labeled by the data units, and analyzing the measurement data using the data units, while interpreting each data unit according to the labeling pattern matched by the data unit.

11. The method of claim 10, wherein the measurement data further pertains to a Polymerase Chain Reaction (PCR) involving the sample.

12. The method of claim 1, further comprising initiating a control operation in a device in communication with said computer.

13. The method of claim 1, wherein the general pattern defined by the token of the same order of in-ordered-list positioning, included in the ordered list that defines the matched labeling pattern, defines a numerical format.

14. An apparatus for automatic categorization of samples according to learnt patterns of labeling, the apparatus comprising:
   a computer;
   a data unit receiver, implemented on the computer, configured to receive a plurality of data units labeling a plurality of physical substance samples such that each one of the data units labels only a respective one of the physical substance samples and each one of the physical substance samples is labeled by only one of the data units;
   a parser, in communication with said data unit receiver, configured to parse each one of the data units into at least one respective ordered list of one or more specific tokens;
   a merger, in communication with said parser, configured to merge for at least one subgroup of said ordered lists, the subgroup consisting of ordered lists of a same number of specific tokens, at least two of the ordered lists in which each pair of specific tokens of a same order of in-ordered-list positioning are at least one of a group consisting of: a pair of identical specific tokens, and a pair of non-identical specific tokens matching a same general token, into an ordered list defining a labeling pattern common to the ordered lists being merged and therefore to more than one of the labeled physical substance samples, the ordered list defining the labeling pattern by including the general token in place of the specific tokens matching the general token; and
   a categorizer, in communication with said merger, configured to categorize a sample by matching a data unit labeling the sample being categorized, to at least one of the labeling patterns the matching being based on a matching criterion, the matching criterion being that each specific token included in an ordered list that is a result of parsing the data unit labeling the sample being categorized, is either identical to a token that is of a same order of in-ordered-list positioning and is included in the ordered list that defines the labeling pattern, or is in conformity to a general pattern defined by the token of the same order of in-ordered-list positioning.

15. The apparatus of claim 14, further comprising a duplicity remover, in communication with said merger, configure to ensure uniqueness of the ordered lists by removing duplicity among the ordered lists.

16. The apparatus of claim 14, wherein the ordered list defining the common pattern is otherwise identical to one of the ordered lists being merged but with each specific token belonging to the pair of non-identical specific tokens, being replaced with the general token.

17. The apparatus of claim 14, further comprising a sample validator, in communication with said categorizer, configured to validate a sample for further processing, according to a result of matching to one of the labeling patterns.

18. The apparatus of claim 14, wherein the data unit receiver is further configured to receive measurement data pertaining to samples labeled by the data units, the apparatus further comprising a preference deriver, in communication with said categorizer, configured to derive a preference among the labeling patterns through an analysis of correlation between the received measurement data and data units as a function of alternative data unit interpretations, each one of the interpretations being based on a different one of the labeling patterns.

19. The apparatus of claim 14, further comprising a heuristic data receiver, in communication with said categorizer, configured to receive heuristic data from a user, wherein at least one of said categorizer and parser is further configured to use the received heuristic data.

20. The apparatus of claim 14, further comprising a preference deriver, in communication with said categorizer, configure to derive a preference among the labeling patterns, according to a count of data units matching each respective one of the labeling patterns.

21. The apparatus of claim 14, wherein at least one of the general patterns is based on a regular expression.

22. The apparatus of claim 14, wherein said parser is further configured to use at least one general token, for parsing the data unit.

23. The apparatus of claim 14, wherein said data unit receiver is further configured to receive measurement data pertaining to the samples labeled by the received data units, the apparatus further comprising a data analyzer configured to analyze the measurement data using the data units, while interpreting each data unit according to the labeling pattern matched by the data unit.

24. The apparatus of claim 14, further comprising a control operation initiator, configured to initiate a control operation in a device in communication with said computer.

25. A non-transitory computer readable medium storing computer executable instructions for performing steps of automatic categorization of samples according to learnt patterns of labeling, the steps comprising:
a) on a computer, receiving a plurality of data units labeling a plurality of physical substance samples such that each one of the data units labels only a respective one of the physical substance samples and each one of the physical substance samples is labeled by only one of the data units;
b) parsing each one of the data units into at least one respective ordered list of one or more specific tokens;
c) for at least one subgroup of said ordered lists, the subgroup consisting of ordered lists of a same number of specific tokens, merging at least two ordered lists in which each pair of specific tokens of a same order of in-ordered-list positioning, are at least one of a group consisting of: a pair of identical specific tokens, and a pair of non-identical specific tokens matching a same general token, into an ordered list defining a labeling pattern common to the ordered lists being merged and therefore to more than one of the labeled physical substance samples, the ordered list defining the labeling pattern by including the general token in place of the specific tokens matching the general token; and
d) categorizing a sample by matching a data unit labeling the sample being categorized, to at least one of the labeling patterns, the matching being based on a matching criterion, the matching criterion being that each specific token included in an ordered list that is a result of parsing the data unit labeling the sample being categorized, is either identical to a token that is of a same order of in-ordered-list positioning and is included in the ordered list that defines the labeling pattern, or is in conformity to a general pattern defined by the token of the same order of in-ordered-list positioning.

26. The method of claim 1, wherein said labeling is a labeling by data.

* * * * *